(12) United States Patent
Boyd

(10) Patent No.: US 7,561,276 B2
(45) Date of Patent: Jul. 14, 2009

(54) DEMODULATION METHOD AND APPARATUS FOR FIBER OPTIC SENSORS

(75) Inventor: Clark Davis Boyd, Radford, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 189 days.

(21) Appl. No.: 11/639,419

(22) Filed: Dec. 15, 2006

(65) Prior Publication Data

US 2007/0165238 A1 Jul. 19, 2007

Related U.S. Application Data

(60) Provisional application No. 60/758,539, filed on Jan. 13, 2006.

(51) Int. Cl.
*G01B 9/02* (2006.01)

(52) U.S. Cl. ...................... 356/480; 356/506

(58) Field of Classification Search ................ 356/477, 356/480, 483, 485, 492, 496, 505, 506, 517, 356/519
See application file for complete search history.

(56) References Cited

U.S. PATENT DOCUMENTS

| | | | |
|---|---|---|---|
| 4,329,058 A | | 5/1982 | James et al. |
| 4,572,669 A | * | 2/1986 | James et al. ............... 356/480 |
| 4,778,987 A | | 10/1988 | Saaski et al. |
| 5,153,669 A | | 10/1992 | Degroot |
| 5,202,939 A | * | 4/1993 | Belleville et al. ............ 385/12 |
| 5,275,053 A | | 1/1994 | Wlodarczyk et al. |
| 5,301,001 A | | 4/1994 | Murphy et al. |
| 5,392,117 A | | 2/1995 | Belleville et al. |
| 5,446,280 A | | 8/1995 | Wang et al. |
| 5,477,323 A | * | 12/1995 | Andrews et al. ............ 356/477 |
| 5,757,487 A | * | 5/1998 | Kersey ...................... 356/478 |
| 5,929,990 A | | 7/1999 | Hall |
| 6,671,055 B1 | | 12/2003 | Wavering et al. ............ 356/478 |
| 2001/0046052 A1 | * | 11/2001 | Toida ........................ 356/480 |
| 2005/0046862 A1 | | 3/2005 | Melnyk |

OTHER PUBLICATIONS

Notification of Transmittal of the International Search Report and the Written Opinion issued in PCT/US06/47719 dated Feb. 7, 2008.
Han et al., "Exact analysis of low-finesse multimode fiber extrinsic Fabry-Perot interferometers", Applied Optics, vol. 43, No. 24, Aug. 20, 2004, pp. 4659-4666.
Schmidt et al., "Fiber-Optic Extrinsic Fabry-Perot Interferometer Strain Sensory with <50 pm displacement resolution using three-wavelength digital phase demodulation", Optics Express, vol. 8, No. 8, Apr. 9, 2001 pp. 475-480.

(Continued)

*Primary Examiner*—Tarifur Chowdhury
*Assistant Examiner*—Jonathon D Cook
(74) *Attorney, Agent, or Firm*—Nixon & Vanderhye P.C.

(57) ABSTRACT

An interferometric sensing arrangement includes an interferometric sensor having an optical path length that varies depending on one or more physical parameters to be measured using the interferometric sensor. One or more light sources are used to generate light at three or more predetermined different fixed wavelengths. In a preferred example embodiment, four fixed wavelength lasers are used to generate light at four predetermined different fixed wavelengths. An optical coupler couples the multiple wavelength light to the interferometric sensor, and a detector measures an amplitude response of an interferometric signal produced by the interferometric sensor. A controller determines the optical path length based on the measured amplitude response.

33 Claims, 10 Drawing Sheets

OTHER PUBLICATIONS

"Distances of Millimeters Measures with Picometer Accuracy", www.photonics.com.

Pérennés et al., "Analysis of a low-finesse Fabry-Perot sensing interferometer illuminated by a multimode optical fiber", Applied Optics, vol. 38, No. 34, Dec. 1, 2004, pp. 7026-7034.

Fielder et al., "High-Temperature, High-Bandwidth Fiber Optic Pressure and Temperature Sensors for Gas Turbine Applications", Phase II Air Force STTR-Draft Final Report, Contract No. F49620-03-C-0010, Dec. 14, 2004, pp. 1-103.

* cited by examiner

Pressure Sensor

Temperature Sensor

DEMODULATION METHOD AND APPARATUS FOR FIBER OPTIC SENSORS

CROSS-REFERENCES TO RELATED APPLICATIONS

This application claims domestic priority from provisional application Ser. No. 60/758,539, filed Jan. 13, 2006, the disclosure of which is incorporated herein by reference.

TECHNICAL FIELD

The technical field relates to fiber optic sensors. The technology described here provides for a method and apparatus for measuring optical path length in a reflective fiber optic sensor at low cost.

BACKGROUND

Fiber optic interferometric sensors have wide application and may be used to sense, for example, temperature, strain, pressure, vibration, and acoustic waves. One example of a fiber optic interferometric sensor is an Extrinsic Fabry-Perot interferometric (EFPI) sensor, which is based on a combination of two light waves as described in U.S. Pat. No. 5,301,001 to Murphy et al., which is incorporated by reference herein. A typical EFPI sensor consists of a Single-mode input fiber and a reflector fiber aligned by a hollow core silica tube. The operation of such an EFPI can be approximated as a two beam interferometer. When the light arrives at the source fiber end-face, a portion is reflected off the fiber/air interface (R1) and the remaining light propagates through a cavity referred to as an air gap with a second reflection occurring at the air/fiber interface (R2). The distance between R1 and R2 is same as the length of the air gap and is one half of an optical path length (defined below). In an interferometric sense, R1 is the reference reflection, and R2 is the sensing reflection. These reflective signals interfere constructively or destructively based on wavelength and the optical path length between the reference and sensing fibers. Small movements from environmental or other physical forces cause a change in the cavity or gap length causing a phase difference between the sensing and reflecting waves producing fringe-based changes in the intensity. The sensitivity to changes in optical path length is proportional to the visibility of the interference fringes reflected back into the input fiber.

Fiber optic sensing systems extract or demodulate measurement information from the sensor(s) that can then be used to measure the optical path length or indicate relative changes in the optical path length, which translate into sensed changes in temperature, strain, pressure, etc. This extraction of sensor measurement information is referred to here as demodulation. Various demodulation techniques to obtain fiber optic sensor measurement data suffer from their own different, specific, shortcomings. Wavelength-based fiber optic sensor demodulation approaches are slow, expensive, and usually limited to one sensor channel. Intensity-based fiber optic sensor demodulation approaches can be faster and less expensive, but they usually do not permit accurate and absolute measurement. And their cost is generally linear with channel count, resulting in high cost for sensor systems that use a large number of sensors.

These fiber optic sensor demodulation approaches also suffer from component-based errors and other inaccuracies caused for example by environmental conditions. One way to reduce these errors is to use components of very high quality with very tight specifications. But the tradeoff is higher cost. Environmental conditions, as a practical matter, may not be readily controlled, or the cost to control them too high.

Certain demodulation approaches have inherent limitations. For example, if a single wavelength of laser light is used in the sensing system, then the demodulation technique is not reliable for larger gap changes or for absolute measurements. The intensity detected by a one wavelength demodulation system can be identical for two very different gaps. A two wavelength measurement approach also suffers from these limitations.

Current demodulation techniques are also vulnerable to light intensity losses that are inevitable in real world systems. Example losses include optical connector and cable losses and fiber bending losses. These losses "scale" or proportionally decrease the detected intensity values, and the scaling factor is not necessarily the same for different wavelengths.

SUMMARY

The innovative optical demodulation technology described below overcomes these problems and provides absolute optical path length (OPL) measurements of one or more fiber sensors. Optical path length is the product of the geometric length of the path that light follows through a system and the index of refraction of the medium through which it propagates. A difference in optical path length between two light paths is often called the optical path difference (OPD). Optical path length is important because it determines the phase of the light and governs interference and diffraction of light as it propagates. More specifically, if a light wave is traveling through several different media, then the optical path length of each medium can be added to find the total optical path length. The optical path difference between the paths taken by two identical optical waves can then be used to find the phase change. The interference between the two waves can be calculated using the phase change. Typically, the absolute optical path length measurements may be used to measure or sense small displacements, but larger displacements may also be measured. The innovative optical demodulation technology may be implemented for large numbers of sensors and operated at high speed at low cost using standard, off-the-shelf components.

The innovative optical demodulation technology includes an interferometric sensor that has an optical path length that varies depending on one or more physical parameters to be measured using the interferometric sensor. Non-limiting examples of an interferometric sensor include a Fabry-Perot sensor, an Extrinsic Fabry-Perot Interferometer (EFPI), a Mach-Zender sensor, or a Michelson sensor. One or more light sources for generating light at three or more different predetermined fixed wavelengths. These wavelengths are "fixed" in the sense that they are specific values established before making the desired measurement. These wavelengths may be adjusted during instrument calibration. Non-limiting examples of some suitable light sources are single mode Fabry Perot lasers, sufficiently narrow or filtered LEDs, external cavity lasers (such as pump lasers with Bragg gratings), and DBR lasers (where a Bragg grating is on-chip, but not in the gain medium). In a preferred, non-limiting example, the light at three or more predetermined different fixed wavelengths is generated using three or more fixed wavelength lasers. An optical coupler couples the multiple wavelength light to the interferometric sensor, and a detector measures an amplitude response of an interferometric signal produced by the interferometric sensor. The optical path length of the interferometric sensor is determined based on the measured amplitude response. A measurement associated with the one or more physical parameters (e.g., strain, displacement, pressure, temperature, etc.) is then provided based on the determined optical path length. Significantly, the determined optical path length is an absolute value—not a relative measurement.

Non-limiting example embodiments may use multiple detectors for detecting the amplitude response of the interferometric signal and/or multiple optical filters to filter the detected amplitude response of the interferometric signal of each one of the fiber optic sensors. In one preferred, non-limiting example, four fixed wavelength lasers are used to generate four different fixed wavelengths though other types of light sources may be used. Also, light with more than four fixed wavelengths may be used.

A fiber optic type interferometric sensor includes a source fiber having a first surface and a reflector having a second surface separated from the first surface by a gap. A first reference reflection (R1) reflecting off a first interface between the first surface and the gap and a second sensing reflection (R2) reflecting off a second interface between the second surface and the gap combine to generate the interferometric signal. A length of the gap between the first and second surfaces is determined based on the measured amplitude response.

A light intensity is determined at each of the multiple wavelengths associated with the detected interferometric signal, and the intensity differences between pairs of different wavelength light intensities are determined. Difference ratios are generated using the multiple intensity differences, and the optical path length is determined based on the difference ratios. The first and second reflections interfere constructively or destructively based on wavelength and an optical path length corresponding to the gap. A change in a length of the air gap causes a change in a phase difference between the first reference reflection and a second sensing reflection resulting in a change in light intensity for each of the multiple different wavelengths associated with the interferometric signal.

The difference ratios are unique for a range of gap lengths that depend on the multiple different wavelengths. Optical path length is determined based on the difference ratios and is used to compensate for variations caused by changes in environment and for losses in the fiber optic sensing system including (but not limited to) one or more of the following losses: optical connector, cable, fiber bending, polarization, and sensor degradation.

Normalized difference ratios are formed by dividing each intensity difference by the intensity difference having a largest magnitude. The polarity, i.e., a numerical sign of either plus (+) or minus (−), for the intensity difference having a largest magnitude is determined and applied to the difference ratio corresponding to the intensity difference having a largest magnitude. A lookup table may be used to map each of various combinations difference ratios to corresponding optical path lengths or gap lengths. The difference ratios may be converted into an optical path length or a gap length using the lookup table.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
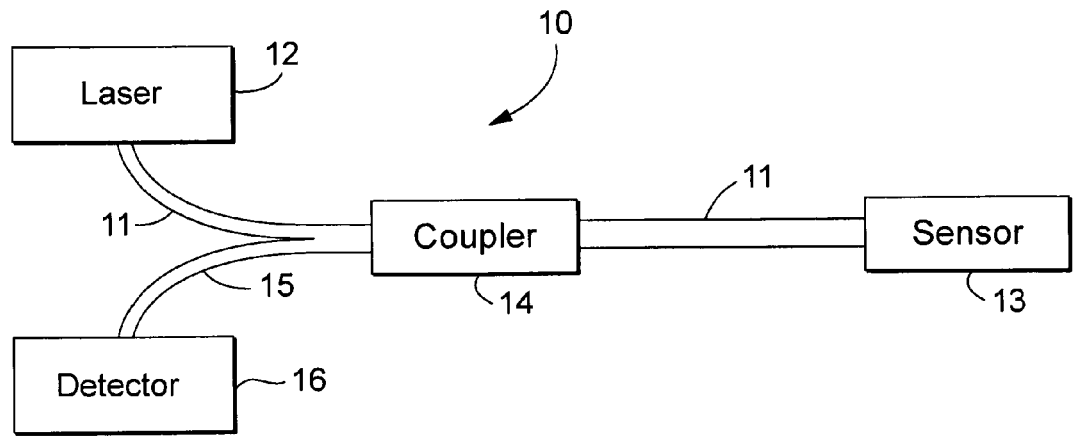
FIG. 1 shows a schematic block diagram of a conventional single wavelength interferometric sensor arrangement.

FIG. 1 shows a schematic block diagram of a conventional interferometric sensor arrangement 10. An input-output fiber 11 (e.g., a single mode fiber) conducts light from a single laser source 12 via a coupler 14 to an interferometric sensor 13 (e.g., an EFPI transducer). A detector 16 detects light reflected back from the sensor 13 via the coupler 14 over fiber 15 (e.g., a single mode fiber 15). Multimode fibers can used under certain conditions.

Figure 2:
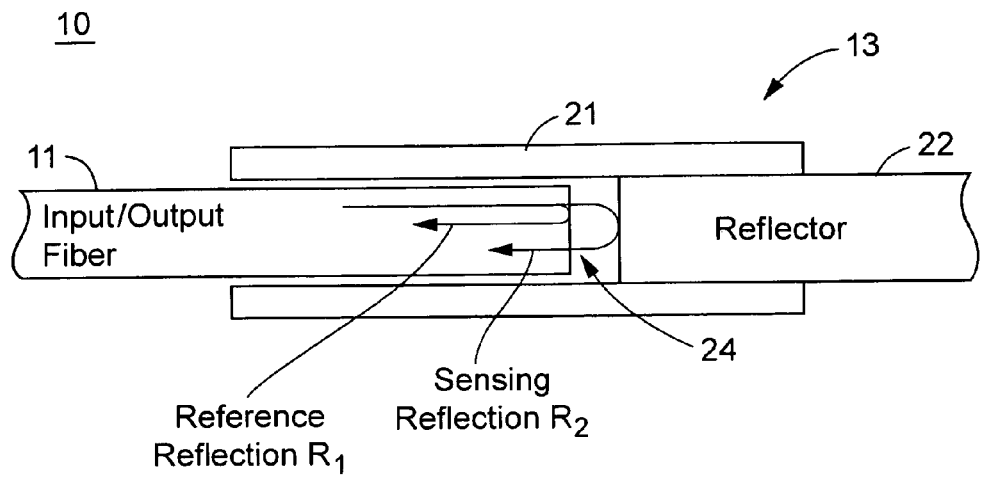
FIG. 2 shows an example construction of an interferometric sensor as a strain gauge.

FIG. 2 shows in more detail an example construction of the interferometric sensor 13 as a strain gauge. The single mode fiber 11 is inserted into one end of a hollow-core silica fiber 21. A multimode or single mode fiber or reflective object 22 is inserted into the opposing end of the hollow fiber 21. The multimode fiber 22 is used purely as a reflector, the far end of the multimode fiber being conditioned by shattering or index match material so the reflection from the far end does not add to the detector noise. The space 24 between the end of the single mode fiber 11 and the end of the reflector 22 forms an air gap that acts as a low-finesse Fabry-Perot cavity.

The Fresnel reflection from the glass-air interface at the front of the air gap (reference reflection) and the reflection from the air-glass interface at the far end of the air gap (sensing reflection) interfere in the input-output fiber 11. Although multiple reflections occur within the air gap, the effect of reflections subsequent to the ones mentioned above are negligible. The two fibers 11 and 22 can move in the silica tube 21 so that changes in the air gap length cause changes in a phase difference between the reference reflection and the sensing reflection. That phase difference changes the intensity or amplitude of the light detected at the output arm 15 of the coupler 14 by detector 16 of FIG. 1.

Figure 3A:
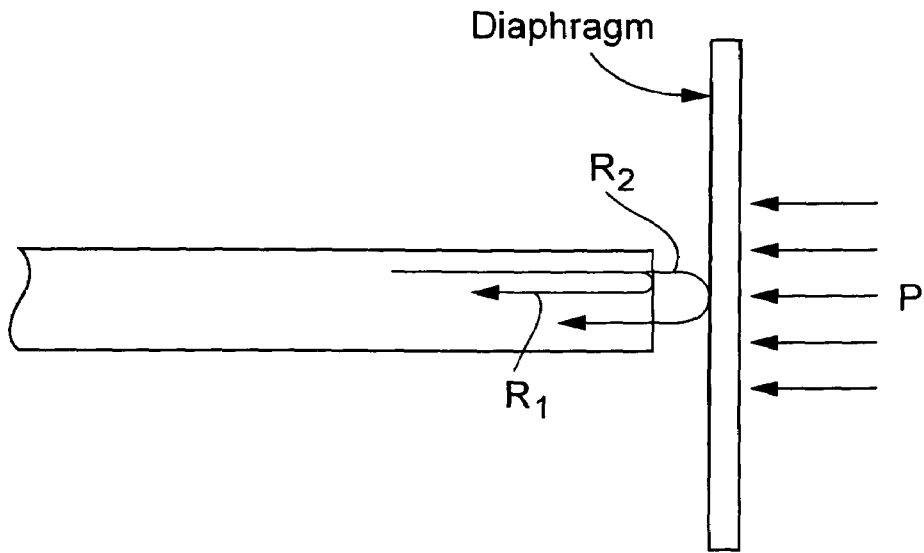
FIG. 3A illustrates an example interferometric pressure sensor.
Figure 3B:
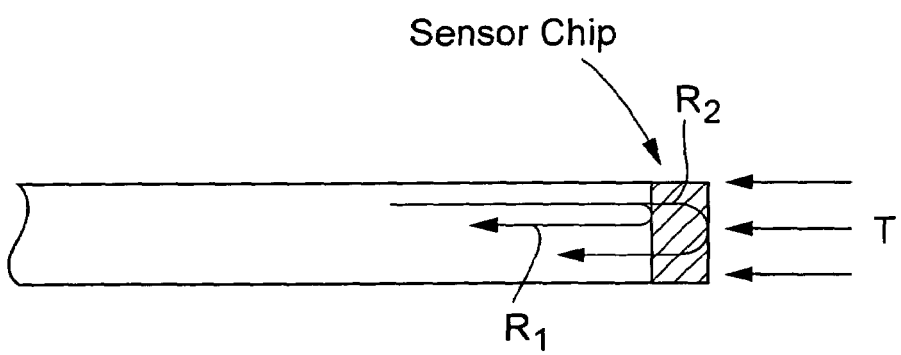
FIG. 3B illustrates an example interferometric temperature sensor.

This reflective type fiber optic sensor can be used in a variety of sensing environments in addition to a strain gauge. For example, FIG. 3A illustrates a pressure sensor. $R_1$ is formed at the fiber/air interface, and $R_2$ is formed at a reflective diaphragm surface. Movement of the diaphragm surface corresponds to changes in pressure P. FIG. 3B illustrates a temperature sensor. $R_1$ is formed at the fiber/sensor chip interface while $R_2$ is formed at the chip/air interface. Another example application is an extensometer for strain and displacement sensing.

Figure 4:
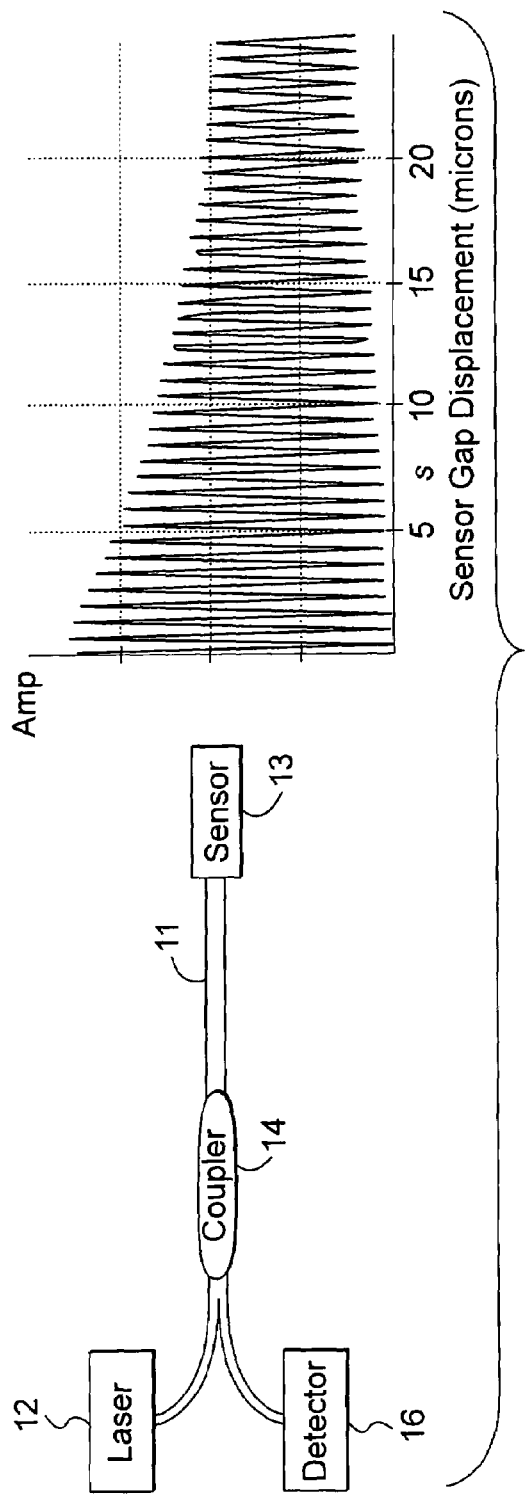
FIG. 4 graphs a detected output of a single wavelength sensor system.
Figure 5:
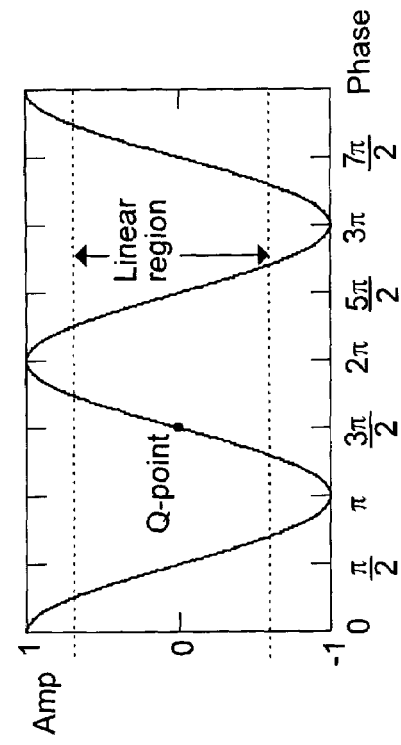
FIG. 5 magnifies a portion of the sinusoidal output from FIG. 4 with a phase change of $\pi$ being correlated with a gap change of ¼ of a wavelength.

FIG. 4 graphs the single detected output of a single wavelength sensor system shown conceptually as a sinusoidal transfer function. As the gap increases, the detected light intensity or amplitude decreases. Disadvantages of a single wavelength approach include a non-linear transfer function and directional ambiguity of the sinusoidal output. As shown in the graph in FIG. 5, if the sensor gap (½ the Optical Path Length, OPL) changes occur at a peak or valley in the sinusoid (i.e., at $\pi$, $2\pi$, $3\pi$, . . . ), then that change will not be detected because the slope of the transfer function is zero at those points. In other words, a single wavelength sensor system only detects changes, and accordingly, only provides relative measurements of gap length. No absolute measurement of gap length is provided. Accordingly, the sensitivity of the system decreases to zero at points near multiples of $\pi$. If the direction of displacement changes at a peak or valley, e.g., near a multiple of $\pi$, that information is lost. This causes directional ambiguity in the signal.

Figure 6:
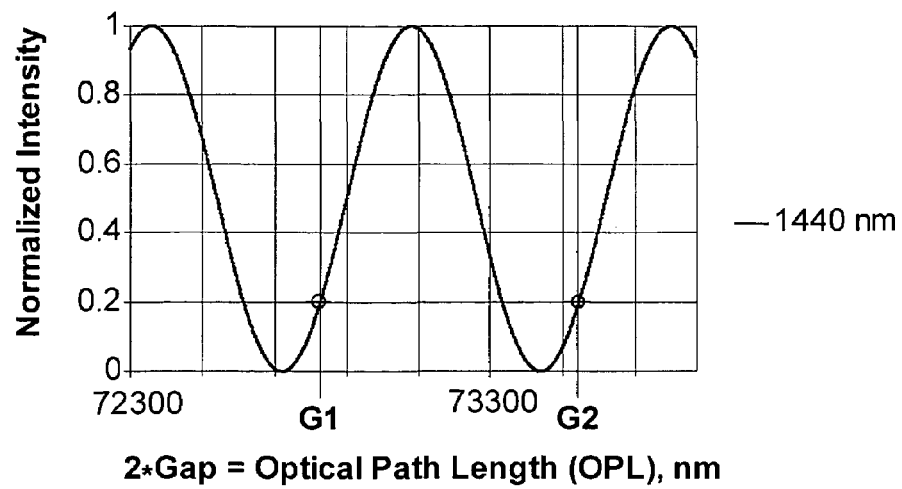
FIG. 6 is a graph illustrating directional ambiguity in the single wavelength system detected output shown in FIG. 4.

The graph in FIG. 6 illustrates an example of such directional ambiguity. A normalized detected interferometric intensity for a single wavelength (1440 nm) is exactly the same—0.2 for two different gaps lengths G1 and G2 which correspond to different optical path lengths. As explained above, the optical path length (OPL) of the sensor 13 is proportional to the length of the gap 24 multiplied by the index of refraction for the gap material. When the gap is an air gap, the index of fraction is 1.0, and the optical path length is twice the length of the gap length. So the two gaps G1 and G2 as well as their respective OPLs are indistinguishable. Other drawbacks of a single wavelength approach described in the background section include losses caused by variations in the optics of the sensing apparatus including connector losses, polarization losses, sensor degradation losses, etc.

In short, although single wavelength systems can be made inexpensively and can generate a unique intensity for a given optical path length, they are linear over only a very short range, generate multiple OPLs for a given intensity, cannot separate intensity contributions and losses due to imperfect connections and fiber effects, and provide only relative measurements. Relative measurement systems need a known starting condition for the sensor and must make measurements faster than the sensor's physical response to be able to track changes from the starting optical path length.

Figure 7:
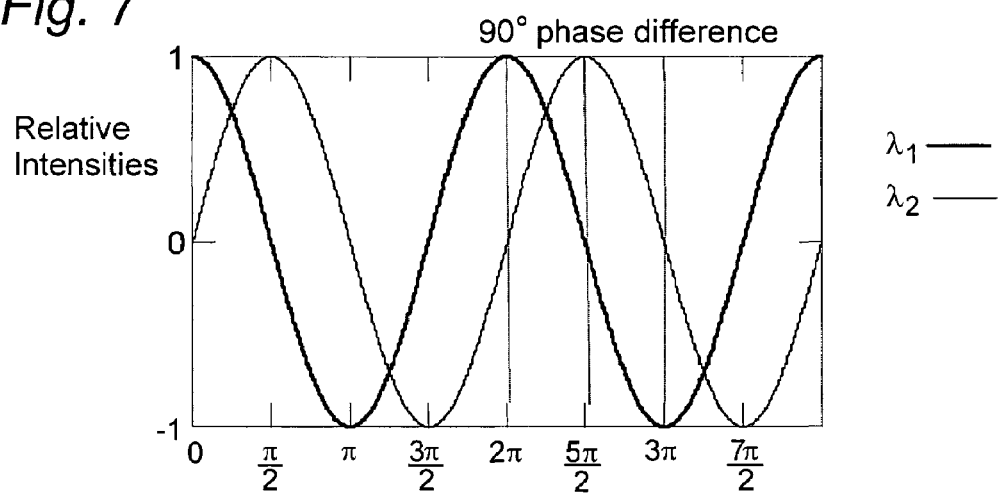
FIG. 7 graphs a detected output of a two wavelength sensor system.
Figure 8:
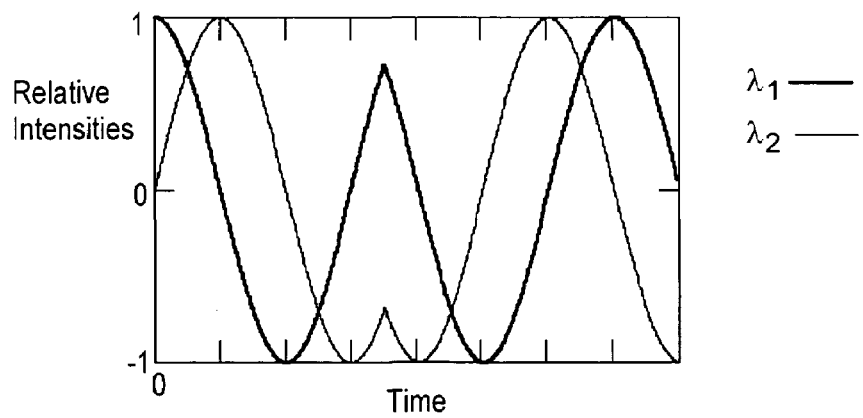
FIG. 8 is a graph illustrating the phase lead/lag relationship at a direction change of the gap, or turnaround for a two wavelength system.

A two wavelength demodulation system uses two quadrature optic channels to provide unambiguous measurements. Two lasers of appropriate output wavelength are selected to generate quadrature, phase-shifted signals for a given sensor air gap. Quadrature signals are ninety degrees out of phase. Consequently, when one of the quadrature signals is at a peak or valley, the other quadrature signal is in the linear region identified in FIG. 7. An output showing the phase lead/lag relationship at a direction change, or turnaround, is shown in FIG. 8. In this way, one signal always has a linear response with the change in gap. By monitoring the phase lead/lag relationship between the signals, the direction of gap movement is unambiguously determined. Although the dual wavelength demodulation system provides a larger linear range, it still suffers from the other drawbacks noted above for the single wavelength demodulation system.

The inventor overcame these problems using a demodulation scheme that uses light having three or more predetermined fixed different wavelengths to provide an unambiguous absolute measurement of the interferometric sensor's optical path length. One or more light sources may be used to provide light at the three or more predetermined fixed different wavelengths. Non-limiting, example embodiments below describe three, four, and "n" fixed wavelength lasers for generating the three, four, or "n" different fixed wavelengths. Although "n" can be any integer number greater than 2, a preferred, non-limiting range for "n" is from 3-10.

The use of three or more wavelengths is important to many applications of sensor measurement. This is due to the dynamic range of the OPL change in most sensor applications. Each additional wavelength added to the measurement system extends the useful measurement range while, at the same time, improving the signal to noise ratio. In many practical applications, the number of additional wavelengths used beyond three is likely dictated by measurement requirements balanced with cost.

In the non-limiting examples described below, fixed wavelength lasers are used, although tunable lasers could be used, but at significantly more expense, delay, and complexity. A tunable laser must have a fairly broad tuning range and be very repeatable and stable—all of which presently amount to significant expense. The laser output must pause briefly at each wavelength to allow stable operation and the receiver must be temporally correlated to the laser output—slowing down the processing speed of the sensing system. A very large amount of data samples must be taken and processed using complicated fast Fourier transform and curve fitting program in order to quantify the optical path length with reasonable accuracy. Indeed, such accuracy requires processing on the order of 2000 samples per each pass of the laser over the tuning range, which significantly complicates and slows down the demodulation. Not only is a tunable laser slow with only a few readings per second, it is subject to errors introduced by dynamic sensor optical path length changes during the scanning of the tunable laser. Another non-limiting example of a suitable light source as mentioned above is a DFB laser FIG. 9 illustrates a non-limiting example embodiment of a three, fixed-wavelength, interferometric sensing system 50. Three different wavelengths which are fixed and predetermined (or otherwise known) are generated by a laser array 52 comprising three fixed pulsed wavelength lasers 52a, 52b, and 52c. Each of the fixed wavelengths may be separated by 2-3 nm. A laser control and clocking circuit 76 generates a high-frequency clock signal to synchronize the lasers 52a, 52b, and 52c and the data collection orchestrated by a controller 66. The laser pulses from each of the fixed pulsed wavelength lasers 52a, 52b, and 52c are time-division multiplexed and serially-combined in a 3×3 optical coupler 54. The output on each leg of the 3×n coupler is a series of pulses from the laser array 52. The multiplexed series of laser pulses are then split in a 3×n optical network 56 which distributes the series of laser pulses to each sensor channel in the sensing system 50. Each sensor channel includes a 2×2 coupler 58 coupled to one of the 3×n optical network 56 outputs, a reference reflector 62, an interferometric sensor 60, and a detector 64. The series of three laser pulses is reflected by the sensor 60 and by the reference reflector 62. The reference signal from reflector 62 is used to normalize intensity variations in the optical network, sources, and the detector. Example normalizations are described in detail below.

Figure 10:
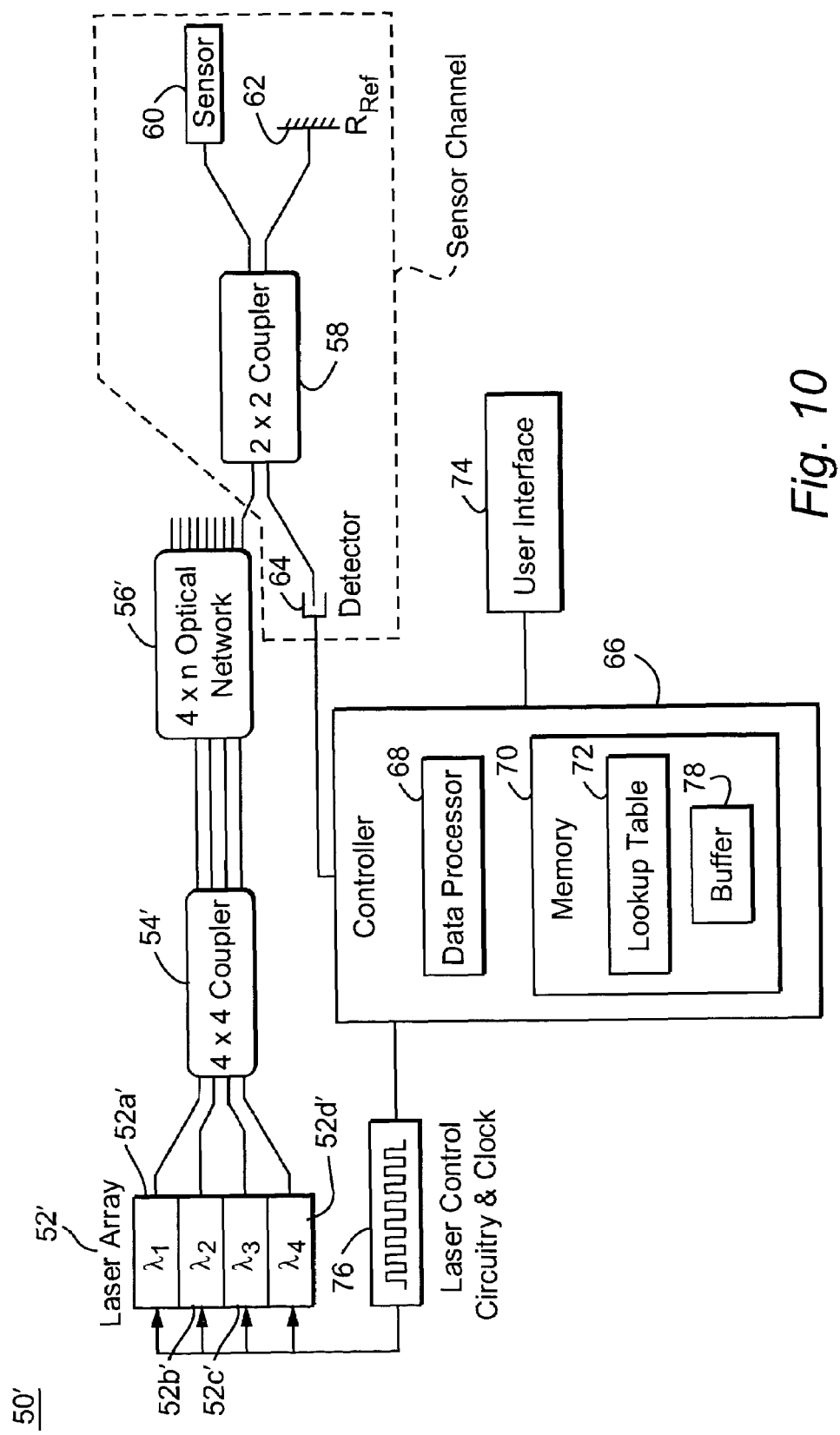
FIG. 10 is a diagram illustrating a non-limiting example of a fixed wavelength interferometric sensing system using light at four different fixed wavelengths.

FIG. 10 shows another non-limiting example embodiment of an interferometric sensing system 50' using four different fixed wavelengths. The four different wavelengths, which are fixed and predetermined or otherwise known, are generated in this example by a laser array 52' comprising four fixed pulsed wavelength lasers 52'a, 52'b, 52'c, and 52'd. Each of the fixed wavelengths may again be separated, for example, by 2-3 mn. A laser control and clocking circuit 76 generates a high-frequency clock signal to synchronize the lasers 52'a, 52'b, 52'c and 52'd and the data collection orchestrated by a controller 66'. The laser pulses from each of the fixed pulsed wavelength lasers 52'a, 52'b, 52'c, and 52'd are time-division multiplexed and serially-combined in a 4×4 optical coupler 54'. The output on each leg of the 4×4 coupler is a series of pulses from the laser array 52'. The series of laser pulses are then split in a 4×n optical network 56' which distributes the series of laser pulses to each sensor channel in the sensing system 50'. Each sensor channel includes a 2×2 coupler 58 coupled to one of the 4×n optical network 56' outputs, a reference reflector 62, an interferometric sensor 60, and a detector 64. The multiplexed series of four laser pulses is reflected by the sensor 60 and by the reference reflector 62. The reference signal from reflector 62 is used to normalize intensity variations in the optical network, sources, and the detector.

Figure 11:
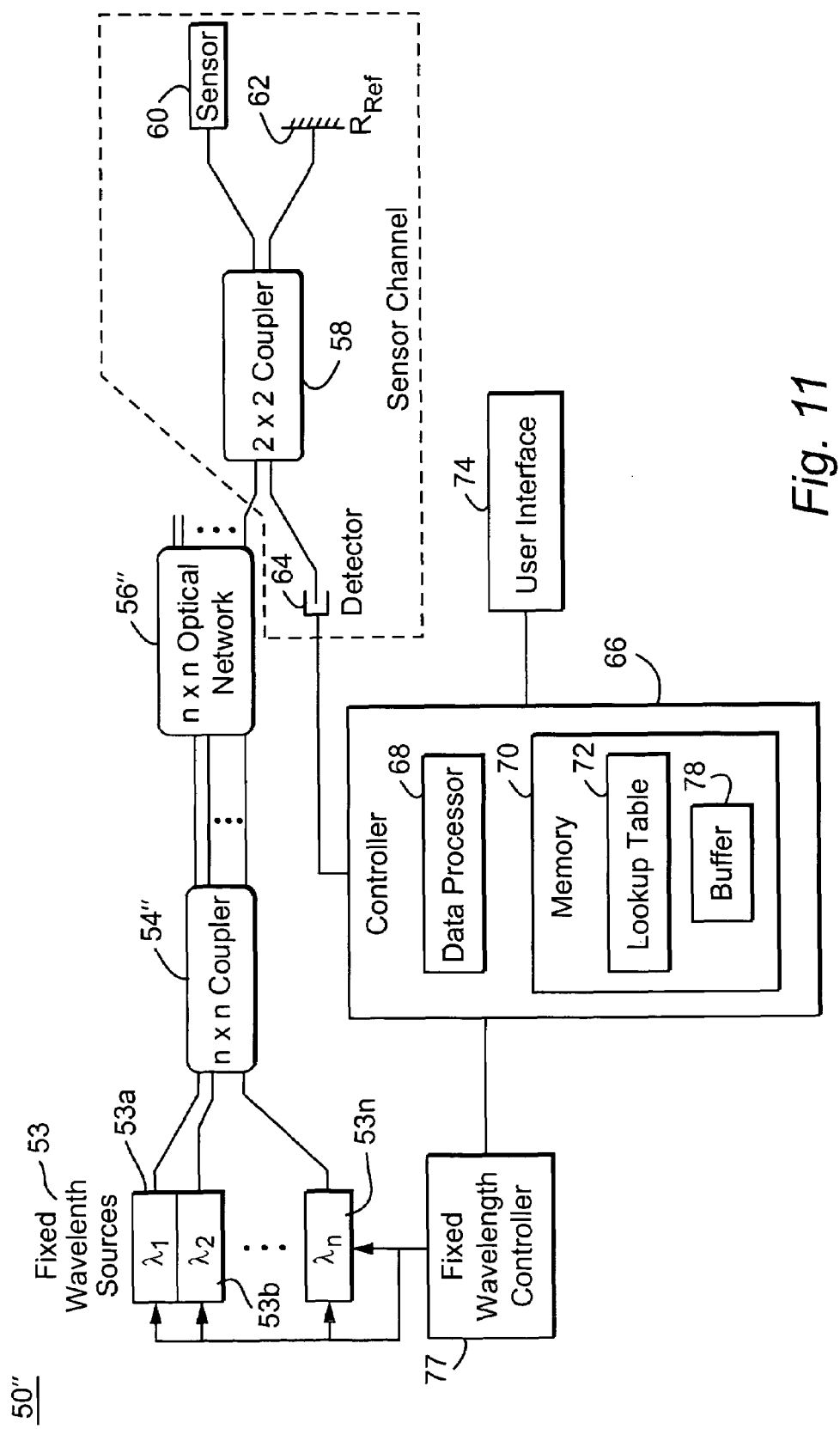
FIG. 11 is a diagram illustrating a non-limiting example of a fixed wavelength interferometric sensing system using light at "n" different fixed wavelengths.

FIG. 11 shows another non-limiting example embodiment of an interferometric sensing system 50" using "n" different fixed wavelengths, where "n" may be an integer greater than 3. The "n" different wavelengths, which are fixed and predetermined or otherwise known, are generated in this example by an array 53 comprising "n" sources of fixed pulsed wavelengths 53a, 53b, . . . 53n. Each of the fixed wavelength sources may be separated, for example, by 2-3 nm. A fixed wavelength controller 77 generates a high-frequency clock signal to synchronize the "n" sources of fixed pulsed wavelengths 53a, 53b, . . . 53n and the data collection orchestrated by a controller 66. The pulses from each of the "n" sources of fixed pulsed wavelengths 53a, 53b, . . . 53n are time-division multiplexed and serially combined in an n×n optical coupler 54". The output on each leg of the n×n coupler is a series of pulses from the "n" sources of fixed pulsed wavelengths 53a, 53b, . . . 53n. The pulse signal is then split in an n×n optical network 56" which distributes the series of laser pulses to each sensor channel in the sensing system 50". Each sensor channel includes a 2×2 coupler 58 coupled to one of the n×n optical network 56" outputs, a reference reflector 62, an interferometric sensor 60, and a detector 64. The multiplexed series of "n" laser pulses is reflected by the sensor 60 and by the reference reflector 62. The reference signal from reflector 62 is used to normalize intensity variations in the optical network, sources, and the detector.

Figure 9:
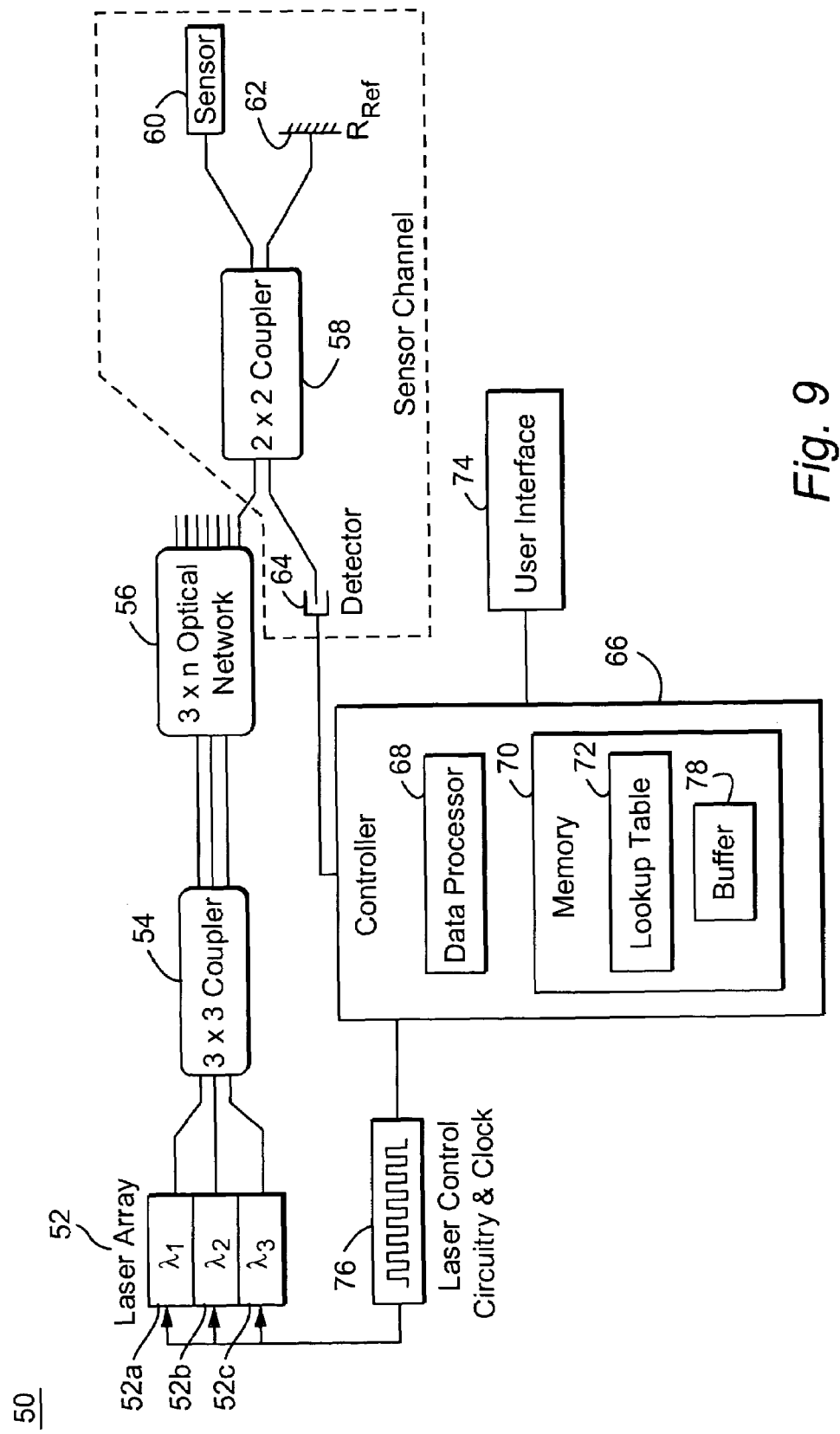
FIG. 9 is a diagram illustrating a non-limiting example of a fixed wavelength interferometric sensing system using light at three different fixed wavelengths.

For the non-limiting example embodiments shown in FIGS. 9-11, the reflected wavelengths from the sensor 60 and the reflector 62 interfere constructively or destructively based on the optical path length (OPL) difference traversed between $R_1$ and $R_2$. The intensity of the reflected interferometric signal is approximately sinusoidal and varies with OPL. The OPL also varies depending on changes in the condition or parameter being sensed by the sensor 60.

The detected raw intensity signals are converted by the detector 64, which may be for example a PIN photodiode, from an optical signal to a corresponding electrical signal. The electrical intensity signals for each sensor channel are received and processed in the controller 66, which may be implemented, for example, using a data processor 68 coupled to a memory 70. The memory stores program code for controlling the data processor 68 to perform various data acquisition and processing operations, some of which are described below. The memory also includes a buffer 78 for storing, at least temporarily, newly acquired intensity data from the sensor channels until the data processor 68 is ready to process it. A lookup table 72 may be employed to obtain optical path lengths or sensor gap values corresponding to the processed intensity data as described below. The retrieved optical path length values, gap values, and/or sensor readings determined from the retrieved optical path length values or gap values may then be provided to any suitable interface such as a user interface 74 or the like. For example, a calibration file, unique to each sensor, may be used to obtain appropriate sensor values in a form expected for the units of measurement for the particular sensor from the measured OPL.

Although a single data processor and memory are shown for illustration purposes, those skilled in the art will appreciate that the functions performed by the processor 68 and memory 70 may be implemented using multiple processors, memories, DSPs, ASICs, etc. Indeed, other hardware and/or software configurations may be employed.

In one non-limiting implementation, the intensity signals from the sensor 60 are first normalized using the laser intensity values obtained from the reference reflector 62. This normalization removes the offset due to any intensity drift in the sources, changes in detector sensitivity, and variation in attenuation in the internal optical network. For embodiments that use four or more different wavelengths, differences between the four signals are then obtained to account for variations in absolute intensity. Such differences are not typically determined for the three wavelength embodiment, due to the limitation that would be imposed on the gap dynamic range. Differences can be taken for very small gap changes with increased risk of inaccurate measurements if the gap changes more than the calculated amount. Ratios between the differences are taken by dividing through by the highest difference value. This results in three ratios, the highest always being one, and the other two being always greater than zero but less than or equal to one. Advantageously, a unique combination of ratiometric values exists for every optical path length. This combination, then, defines a unique address in a look-up table that is used by the processor 68 to look up a corresponding OPL or gap in the lookup table 72. The lookup table 72 is created using an analytical model of the sensor 60, which is then fit to experimentally-obtained data.

Figure 12:
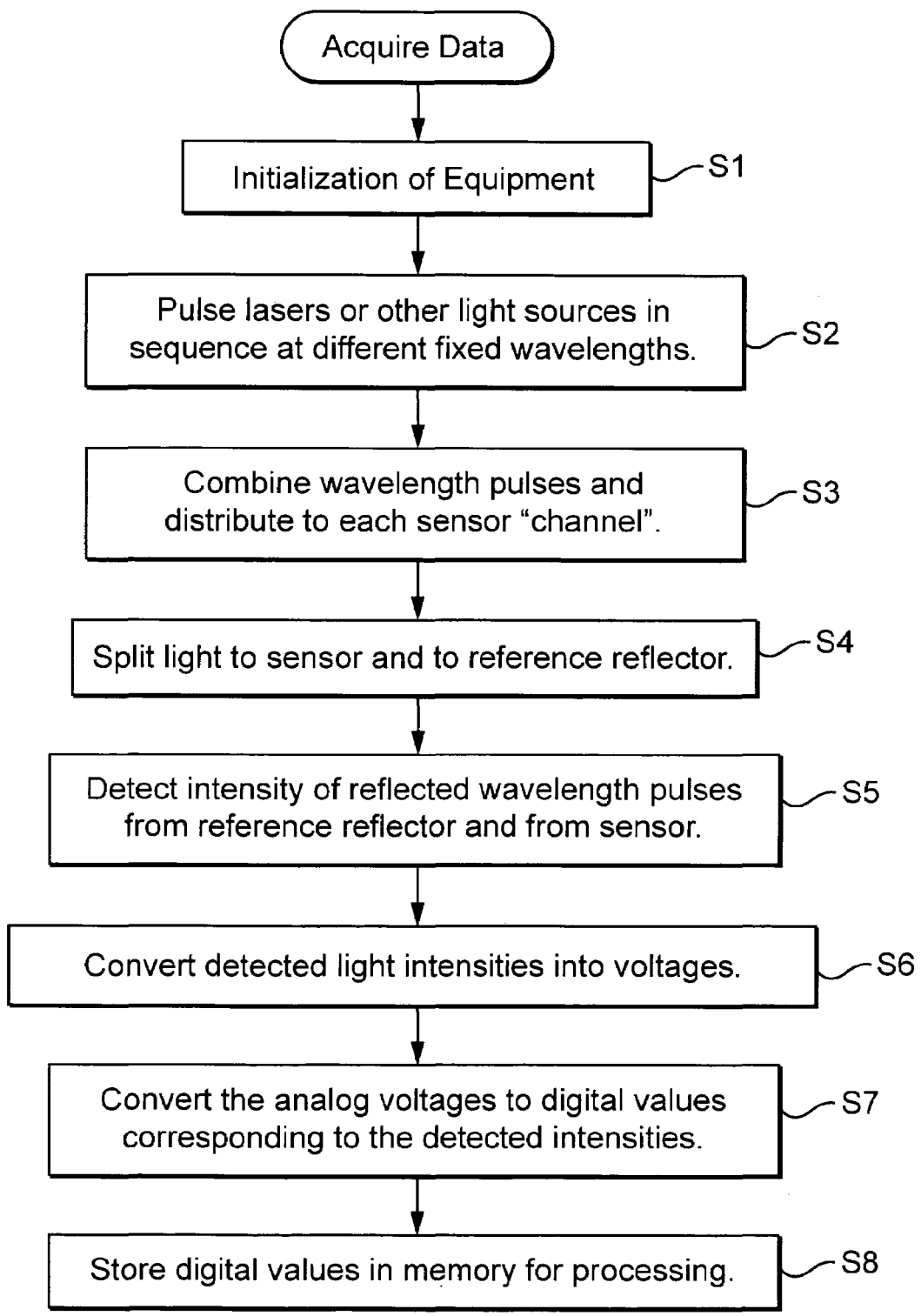
FIG. 12 is a flow chart diagram illustrating non-limiting, example procedures that may be used to acquire intensity data from an interferometric sensing system that uses light at different predetermined fixed wavelengths.

FIG. 12 is a flow chart diagram titled "Acquire Data" illustrating non-limiting, example procedures that may be used to acquire intensity data from an interferometric sensing system that uses light at different predetermined fixed wavelengths. For simplicity, the example steps are described in the context of one sensor channel for one set of sensed intensity data, but it will be appreciated that these steps may also be performed for multiple sets of sensed intensity data and/or for multiple sensor channels. The interferometric sensing system equipment is reset and/or initialized where and when appropriate (step S1). The fixed wavelength lasers or other light sources are pulsed in sequence at predetermined different fixed wavelengths (step S2). The wavelength pulses are combined and distributed to each interferometric sensor channel (step S3). The light on each channel is split between the interferometric sensor and the reference reflector (step S4). A detector detects the intensity or amplitude of reflected wavelength pulses from the reference reflector and the sensor (step S5). The light intensity signal is converted into an electrical intensity signal, e.g., voltage signals, (step S6). The voltage signals are converted to digital values (step S7). The digital intensity values are stored in the buffer 78 awaiting processing (step S8).

Figure 13:
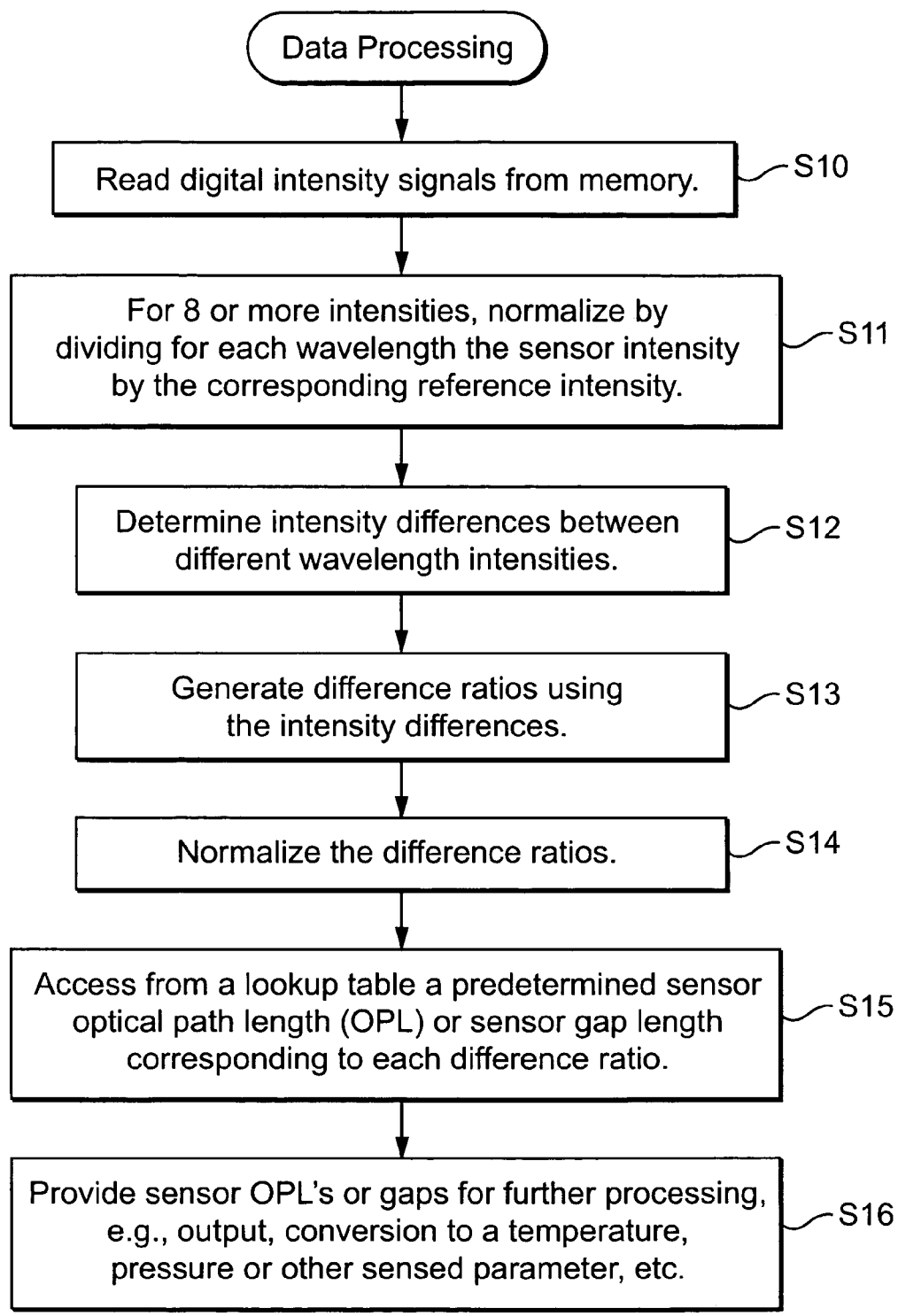
FIG. 13 is a flow chart diagram illustrating non-limiting, example procedures that may be used to process intensity data acquired from an interferometric sensing system that uses light at different predetermined fixed wavelengths.

FIG. 13 is a flow chart diagram titled "Data Processing" illustrating non-limiting, example procedures that may be used to process intensity data acquired from an interferometric sensing system that uses light at different predetermined fixed wavelengths—in this example case—four or more wavelengths. As with FIG. 12, for simplicity, the example steps are described in the context of one sensor channel for one set of sensed intensity data, but it will be appreciated that these steps may also be performed for multiple sets of sensed intensity data and/or for multiple sensor channels.

Initially, digital intensity signals for each sensor stored in the buffer are read out, either sensor by sensor, in groups of sensors, for all sensors, or in any other suitable fashion so that the data can be processed (step S10). For 8 or more intensities (corresponding to four or more reflected reference intensities and four or more reflected sensor intensities), the intensities are normalized by dividing for each wavelength the sensor intensity by the reference intensity (step S11). This normalization removes the effects of variations in the light sources. In the example of four wavelengths, the result is four normalized intensities at each of the four wavelengths. Then intensity differences between various ones of the normalized intensities are determined (step S12). Determining the intensity differences effectively removes any additive effects such as DC offset errors caused by sensor construction and signal path reflections. A second type of errors called scaling errors result from losses in the signal path or a reduction in the reflection intensity due to increased gap distance. Scaling errors are removed by using unitless values that result from dividing all of the differences by one of the difference values rather than by using the intensity differences directly (step S13). In a preferred example, the highest difference value is used as the divisor. The difference ratios are then normalized to the highest absolute value (step S14). Because the combination of normalized difference ratios are unique for a range of gaps that are dependent on the source wavelengths due to the uniqueness and independence of each individual intensity, those ratios are used to address the lookup table to retrieve a corresponding OPL or gap length.

The lookup table may be generated using calculated intensities for particular gaps and wavelengths. For example, the intensity I may be determined in accordance with the following equation: $I = 1 - \cos(4\pi G/\lambda)$, where G is the gap and $\lambda$ is the wavelength. So for the four wavelength case, four intensities are calculated at each of the four wavelengths for each gap. Then those calculated intensities may, if desired, be normalized, differenced, and/or ratioed as explained above for the data processing of measured intensity values. The ratios in the four wavelength example may be concatenated together to formulate an address which is converted to binary form. Other address formulations may be used. Once the table is completed, a table lookup with the measured intensity difference ratios being formulated as an address is performed, and a closest match made to one of the table addresses to retrieve the corresponding gap or OPL. Various methods may be used to determine the closest matching address. One example is to use a least squares fit algorithm.

To help illustrate the data processing of measured intensities at multiple wavelengths, an example is now provided for a four fixed wavelength case shown in FIG. 10. There is some loss L in the various connectors and cables that is very similar for closely spaced wavelengths of similar power. Now, the four wavelength sensor intensities, normalized by the four corresponding wavelength reference intensities, depend on the gap size, wavelength, and reflectivity are labeled $I_{Ar}$, $I_{Br}$, $I_{Cr}$ and $I_{Dr}$. The additive DC offset is removed in the following intensity difference calculations:

$$I_{1r} = I_{Ar} - I_{Br}$$

$$I_{2r} = I_{Br} - I_{Cr}$$

$$I_{3r} = I_{Cr} - I_{Dr}$$

But the differencing does not compensate for scaling errors such as the losses L in the cables and connectors. By determining the ratios of these intensity signals (in this case, each of the difference intensities is divided by $I_{1r}$), the losses L are canceled out that are not spectrally dependant. In this way, for example, the affects of connector and network losses are removed from the final results of the calculations.

$$I_{1f} = I_{1r}/I_{1r} = 1$$

$$I_{2f} = 0 > I_{2r}/I_{1r} < 1$$

$$I_{3f} = 0 > I_{3r}/I_{1r} < 1$$

The intensity difference ratios $I_{1f}$, $I_{2f}$, and $I_{3f}$ are unique ratios for a range of gaps that depend on the light source wavelengths. It is preferred that the source wavelengths are fixed, stable, and accurately characterized as a part of the initial system calibration or during system recalibration. For example, Bragg-stabilized sources commonly used in telecommunications having good stability may be used.

Figure 14:
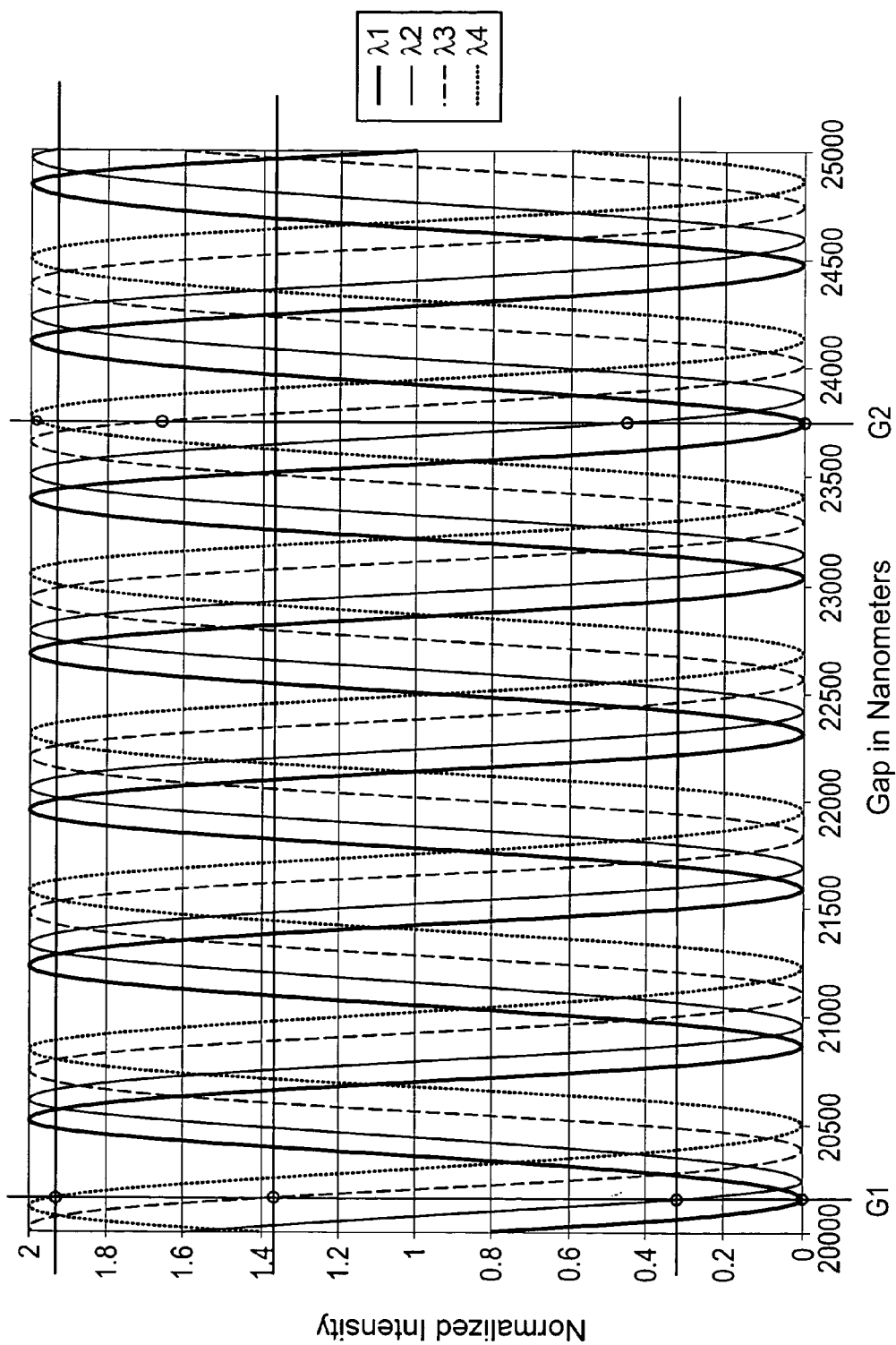
FIG. 14 is a graph illustrating the absence of directional ambiguity in the detected outputs for an interferometric sensing system that uses light at different predetermined fixed wavelengths.

FIG. 14 illustrates a graph of normalized detected intensities for the four wavelength example against gap length in nanometers. Each detected intensity is sinusoidal and out of phase with the detected intensity signals at the other three wavelengths. In contrast with FIG. 6, the FIG. 14 graph shows there is a unique combination of intensity difference ratios for a given gap size or optical path length (OPL). Two different gaps G1 and G2 on the single wavelength graph in FIG. 6 are both at the same one normalized intensity of 0.2 for the 1440 nm wavelength. So it is uncertain when the detector detects this intensity value whether the sensor is at gap G1 or at gap G2. But in FIG. 14, gap G1 has different normalized intensity values at three of the four wavelengths as compared to gap G2. So it is readily apparent which gap is detected based on the four wavelength intensities.

Although the example data processing described includes normalization, differencing, and/or determining of difference ratios, none of these additional processings, though beneficial for the reasons stated above, is essential. Determination of the sensor gap size or OPL may be performed sufficiently simply by obtaining the intensities detected for each of the three or more sensor wavelength reflections, and using them to retrieve from a lookup table the corresponding sensor gap or OPL.

This demodulation approach has several features that enable it to capture the best qualities of fiber optic sensor platforms, while avoiding traditional tradeoffs. First is the absolute measurement capability. The multi-wavelength system returns an absolute engineering value on startup and does not require sensor modulation to obtain a reading. This is accomplished by utilizing the differential response of the four wavelengths. Wavelengths are selected such that their ratios do not repeat over the dynamic range of interest for interferometric-based sensors.

Second, the demodulation system is not susceptible to drift in source intensity, detector sensitivity, or variations in optical network attenuation. Source and detector variation is normalized using the reference reflector. A single detector is used per channel, eliminating sensitivity variations observed in multiple-detector systems. By calculating gap based on a ratio of differences, instead of absolute optical intensity, variations in the optical network due to connectorization, polarization, cable routing, sensor degradation, etc., are overcome.

Third, very high sample rates using high-speed, low-noise detector. Absolute spectrometer-based systems are limited to approximately an order of magnitude or more slower. Fourth, a very large number of sensor channels may be serviced using high-power pump lasers and high-efficiency optical networks. Pump lasers are commonly used in long-haul telecommunication applications. Fifth, the demodulation system may be made if desired using all commercial off the shelf (COTS) components used in telecommunications that are readily available at low-cost and high-volumes.

Although various embodiments have been shown and described in detailed, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A measuring method for use with an interferometric sensor, comprising:
    generating light at three or more predetermined different fixed wavelengths;
    providing the light at three or more predetermined different fixed wavelengths to the interferometric sensor;
    measuring an amplitude response of an interferometric signal produced by the interferometric sensor; and
    determining an optical path length associated with the interferometric sensor based on the measured amplitude response,
    wherein the optical path length varies depending on one or more physical parameters to be measured using the interferometric sensor.

2. The method in claim 1, further comprising:
    providing a measurement associated with the one or more physical parameters based on the determined optical path length.

3. The method in claim 1, wherein the determined optical path length is an absolute optical path length value associated with the interferometric sensor.

4. The method in claim 1, wherein light is pulsed light generated at a number of different fixed wavelengths in the range of 3-10.

5. The method in claim 1, wherein the interferometric sensor is a Fabry-Perot sensor, an Extrinsic Fabry-Perot Interferometer (EFPI), a Mach-Zender sensor, or a Michelson sensor.

6. The method in claim 1, further comprising:
    using one or more detectors to detect the amplitude response of the interferometric signal.

7. The method in claim 1, further comprising:
    using multiple detectors to detect the amplitude response of the interferometric signal to increase the speed at which the optical path length based on the measured amplitude response is determined.

8. The method in claim 1, further comprising:
    using multiple detectors with optical filters to detect and filter the amplitude response of the interferometric signal of each one of the fiber optic sensors.

9. The method in claim 1 applied to multiple interferometric sensors.

10. The method in claim 1 for use in a fiber optic sensing system where the interferometric sensor is a fiber optic sensor, further comprising:
    transmitting a pulsed light signal from four fixed wavelength lasers at four fixed wavelengths to the fiber optic sensor that includes a source fiber having a first surface and a reflector having a second surface separated from the first surface by a gap, the fiber optic sensor having a first surface which has first interface and a reflector having a second surface which has a second interface, wherein the first and second surfaces are separated by a gap, and wherein a reference reflection reflects off the first interface and a sensing reflection reflects off the second interface and the reference reflection and sensing reflection combine to generate the interferometric signal, and
    determining a length of the gap between the first and second surfaces based on the measured amplitude response.

11. The method in claim 10, wherein measuring the amplitude response includes determining a light intensity at each of the four different wavelengths associated with the detected interferometric signal, the method further comprising:
    determining intensity differences between pairs of different wavelength light intensities;
    generating difference ratios using the intensity differences, wherein the optical path length is determined based on the difference ratios.

12. The method in claim 11, wherein the first and second reflections interfere constructively or destructively based on wavelength and an optical path length corresponding to the gap, and
    wherein a change in a length of the air gap causes a change in a phase difference between the first reference reflection and the second sensing reflection resulting in a change in light intensity at each of the four different wavelengths associated with the interferometric signal.

13. The method in claim 11, wherein the difference ratios are unique for a range of gap lengths that depend on the multiple different wavelengths.

14. The method in claim 11, wherein determining the optical path length based on the difference ratios compensates for variations caused by changes in environment and for losses in the fiber optic sensing system including one or more of the following losses: optical connector, cable, fiber bending, polarization, and sensor degradation.

15. The method in claim 11, wherein the difference ratios are formed by dividing each intensity difference by the intensity difference having a largest magnitude.

16. The method in claim 15, further comprising:
determining a polarity for the intensity difference having a largest magnitude, and
applying that polarity to the difference ratio corresponding to the intensity difference having a largest magnitude.

17. The method in claim 11, further comprising:
converting the difference ratios into an optical path length or a gap length associated with the interferometric sensor using a lookup table having each of various combinations difference ratios mapped to corresponding optical path lengths or gap lengths.

18. An interferometric sensing arrangement, comprising an interferometric sensor associated with an optical path length that varies depending on one or more physical parameters to be measured using the interferometric sensor, comprising:
one or more light sources arranged to generate light at three or more predetermined different fixed wavelengths;
an optical coupler arranged to provide the light at three or more predetermined different fixed wavelengths to the interferometric sensor;
a detector arranged to measure an amplitude response of an interferometric signal produced by the interferometric sensor; and
a controller configured to determine the optical path length associated with the interferometric sensor based on the measured amplitude response.

19. The interferometric sensing arrangement in claim 18, wherein the controller is configured to provide a measurement associated with the one or more physical parameters based on the determined optical path length.

20. The interferometric sensing arrangement in claim 18, wherein the determined optical path length is an absolute optical path length value associated with the interferometric sensor.

21. The interferometric sensing arrangement in claim 18, wherein a number different fixed wavelengths is in the range of 3-10.

22. The interferometric sensing arrangement in claim 18, wherein the one or more light sources are pulsed light sources that include three or more fixed wavelength lasers.

23. The interferometric sensing arrangement in claim 18, wherein the interferometric sensor is a Fabry-Perot sensor, an Extrinsic Fabry-Perot Interferometer (EFPI), a Mach-Zender sensor, or a Michelson sensor.

24. The interferometric sensing arrangement in claim 18, further comprising: multiple detectors for detecting the amplitude response of the interferometric signal.

25. The interferometric sensing arrangement in claim 24, further comprising:
multiple optical filters coupled to filter the amplitude response of the interferometric signal of each one of the fiber optic sensors received from the multiple detectors.

26. The interferometric sensing arrangement in claim 18 for use in a fiber optic sensing system, wherein the number of fixed wavelengths is four to generate light at four different fixed wavelengths,
wherein the interferometric sensor is a fiber optic sensor that includes a source fiber having a first surface and a reflector having a second surface separated from the first surface by a gap, the fiber optic sensor having a first surface which has first interface and a reflector having a second surface which has a second interface, wherein the first and second surfaces are separated by a gap, and wherein a reference reflection reflects off the first interface and a sensing reflection reflects off the second interface and the reference reflection and sensing reflection combine to generate the interferometric signal, and
wherein the controller is configured to determine a length of the gap between the first and second surfaces based on the measured amplitude response.

27. The interferometric sensing arrangement in claim 26, wherein the controller is further configured to:
determine a light intensity at each of the four different wavelengths associated with the detected interferometric signal;
determine intensity differences between pairs of different wavelength light intensities;
generate difference ratios using the multiple intensity differences; and
determine the optical path length associated with the interferometric sensor based on the difference ratios.

28. The interferometric sensing arrangement in claim 27, wherein the first and second reflections interfere constructively or destructively based on wavelength and an optical path length corresponding to the gap, and
wherein a change in a length of the air gap causes a change in a phase difference between the first reference reflection and the second sensing reflection resulting in a change in light intensity at each of the fixed wavelengths associated with the interferometric signal.

29. The interferometric sensing arrangement in claim 27, wherein the difference ratios are unique for a range of gap lengths that depend on the multiple different wavelengths.

30. The interferometric sensing arrangement in claim 27, wherein the controller is configured to determine optical path length of the sensor based on the difference ratios to compensate for variations caused by changes in environment and for losses in the fiber optic sensing system including one or more of the following losses: optical connector, cable, fiber bending, polarization, and sensor degradation.

31. The interferometric sensing arrangement in claim 27, wherein the controller is configured to form difference ratios by dividing each intensity difference by the intensity difference having a largest magnitude.

32. The interferometric sensing arrangement in claim 31, wherein the controller is configured to determine a polarity for the intensity difference having a largest magnitude and apply that polarity to the difference ratio corresponding to the intensity difference having a largest magnitude.

33. The interferometric sensing arrangement in claim 27, further comprising:
a memory coupled to the controller for storing a lookup table having corresponding optical path lengths or gap lengths mapped to each of various combinations difference ratios,
wherein the controller is configured to convert the difference ratios into an optical path length or a gap length using the lookup table.

\* \* \* \* \*